United States Patent [19]

Thompson

[11] Patent Number: 5,355,600
[45] Date of Patent: Oct. 18, 1994

[54] POINT-OF-PURCHASE DISPLAYS AND SIGNS WITH LIGHT TRANSMITTING VISUAL EFFECTS

[76] Inventor: Marion E. Thompson, 319 Mt. View La., Colorado Springs, Colo. 80907

[21] Appl. No.: 711,135

[22] Filed: Jun. 6, 1991

[51] Int. Cl.$^5$ .............................................. G09F 19/00
[52] U.S. Cl. .................................... 40/435; 40/474
[58] Field of Search ............... 40/430, 433, 435, 474, 40/495

[56] References Cited

U.S. PATENT DOCUMENTS

| | | |
|---|---|---|
| 885,127 | 4/1908 | Zalinski . |
| 887,766 | 5/1908 | Butt . |
| 1,157,672 | 10/1915 | Brittain . |
| 1,379,392 | 5/1921 | Buckley . |
| 1,684,534 | 9/1928 | Campbell ............................ 40/433 |
| 1,743,017 | 1/1930 | Kennedy . |
| 1,755,848 | 4/1930 | Taylor . |
| 2,197,057 | 4/1940 | Oakley . |
| 2,265,611 | 12/1941 | Perkins . |
| 2,527,803 | 10/1950 | Fleak . |
| 3,155,430 | 11/1964 | Schindler ....................... 40/435 X |
| 3,245,163 | 4/1966 | Allen .................................. 40/433 |
| 3,272,506 | 9/1966 | Lescher . |
| 3,365,825 | 1/1968 | Fossa . |
| 3,381,399 | 5/1968 | Drueck, Jr. . |
| 3,694,645 | 9/1972 | Brantz . |
| 4,099,340 | 7/1978 | Butler . |

FOREIGN PATENT DOCUMENTS 21504  10/1905  United Kingdom ............... 40/433

OTHER PUBLICATIONS

"Eye Catchers" Spectra Star advertising material, 1990.
Specialty Promotions, Inc. "Manifestations" advertising material; 1990.

*Primary Examiner*—Brian K. Green
*Attorney, Agent, or Firm*—Nixon & Vanderhye

[57] ABSTRACT

A point-of-purchase display assembly or signage includes gear discs which rotate about parallel axes and have light transforming material disposed on their outer faces. The discs are rotated (at about 10–20 rpm) to continuously change the visual perception by an observer of the light transforming material. The light transforming material may be holographic or diffraction material, or patterned metallized foil. Modules of the gears are mounted in a linear support, or in channels in a bar or plate, and are covered by a lens. Alternatively, a number of gears/discs may be connected together by chain links. All of the elements are preferably of plastic.

26 Claims, 3 Drawing Sheets

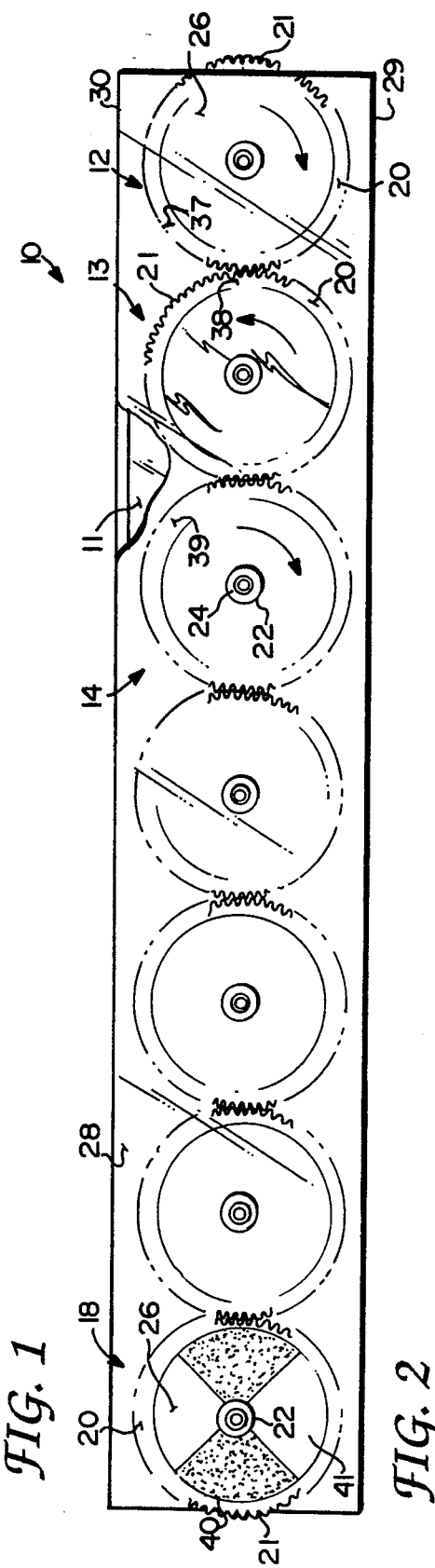
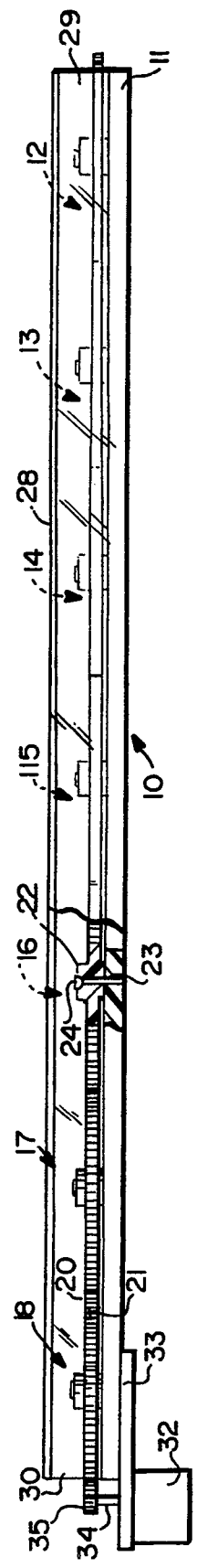
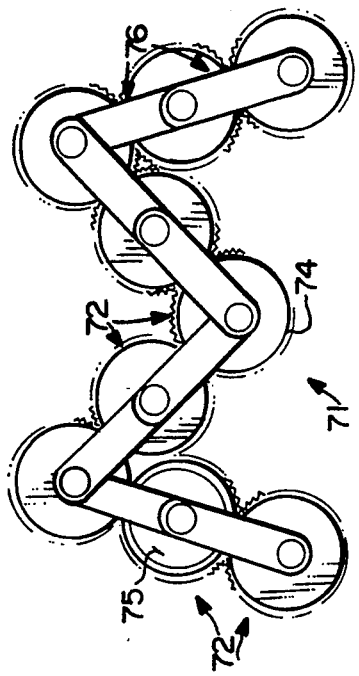
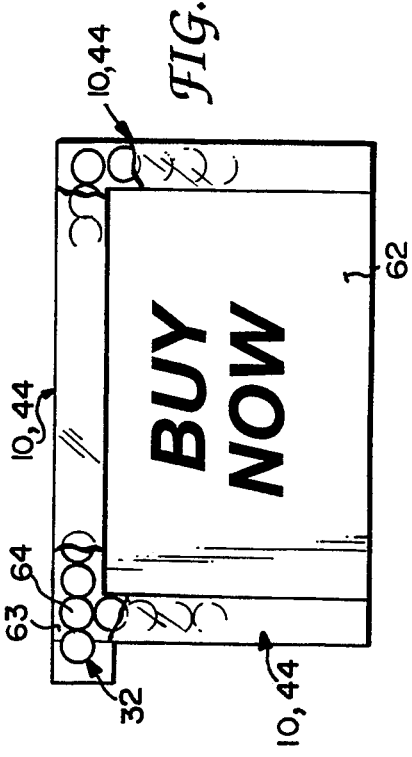

POINT-OF-PURCHASE DISPLAYS AND SIGNS WITH LIGHT TRANSMITTING VISUAL EFFECTS

BACKGROUND AND SUMMARY OF THE INVENTION

In the point-of-purchase field, and for signage in general, it has been demonstrated "motion" provides better attention capturing ability than static displays. It has also been found that the utilization of holographic, diffraction, or metallized foil materials can provide an unusual attention getting effect at the point-of-purchase area, or for signs in general. According to the present invention, these two basic concepts are combined to produce various structures, and in the practice of various methods, so that in a very simple manner dramatically effective point-of-purchase displays or other signage may be provided.

According to one aspect of the present invention, basic elements of providing the motion desired for effective point-of-purchase display is obtained by utilizing plastic gears which are mounted to a support for rotation about parallel axes, and which interengage each other. Various indicia are provided on the gears for providing dramatic effects, such as by providing holographic, diffraction, or metallized foil material on the gears, in addition to applying colored label material, letter or numerical indicia, or other visual effect providing structures to the gears. The gears may be mounted in modules, on sheets, or in other simplified manners. By providing linear modules, the attention getting mechanisms can be assembled together in any manner desired to produce a variety of effects. Further, the gears may be mounted together by links, like chain links, so that the gears may be assembled into any desired non-linear configurations. Utilizing the invention, in a simple and inexpensive manner a cornucopia of dramatic, attention getting effects may be provided at a point-of-purchase (the term "point-of-purchase" in the present application is intended to cover signs in general as well as specific point-of-purchase areas).

According to one aspect of the present invention, a point-of-purchase display module is provided comprising a linear support and a plurality of discs, each having an outer face and rotatable about an axis of rotation generally concentric with the disc. Gear teeth are formed on the circumferential periphery of each, and visual effect indicia or material is disposed on each disc outer face. Means are provided for mounting the discs to the linear support in a linear array with the teeth of adjacent discs intermeshing, and with the outer face of each facing away from the linear support. A lens, and means for mounting the lens so that it is located over the disc outer faces, are also preferably provided, as well as a motor. For high RPM up to 150, the drive shaft of the motor may be operatively connected to one of the peripheral gear teeth of one disc, or to a gear reducer, and then the motor rotates the discs at a relatively slow speed, preferably approximately 10–20 rpm. The support, discs, lens and mounting means are preferably all plastic, while the visual effect indicia or material is preferably selected from the group consisting essentially of holographic material, diffraction material, and patterned metallized foil (such as having a starburst pattern, or a plurality of eccentric circles pattern).

According to another aspect of the present invention, a point-of-purchase display assembly is provided comprising the following elements: A plurality of discs each having an outer face, and rotatable about an axis of rotation generally concentric with the disc, and gear teeth formed on the circumferential periphery thereof, the gear teeth of the discs intermeshing so that driving of one disc drives the others; and wherein each of the gears has an inner face, opposite the outer face, and a hub extending outwardly from the inside face. Visual effect indicia or material disposed on each disc outer face. Means for rotating the discs about their axes of rotation by driving one of the discs. And, a support structure, and means for defining a channel in the support structure, the channel being dimensioned to receive the gear hubs therein, interengagement between the hubs and the portion of the support structure defining the channel, and the gears with each other, mounting the gears for rotational movement about parallel axes. A lens may cover the outer faces of the gears and cooperate with the channel support structure to hold the gears in place.

According to another aspect of the present invention, a point-of-purchase display assembly is provided comprising: A plurality of discs each having an outer face, and rotatable about an axis of rotation generally concentric with the disc, and gear teeth formed on the circumferential periphery thereof, the gear teeth of the disc intermeshing so that driving of one disc drives the others; and wherein each of the gears has an inner face, opposite the outer face, and a hub extending outwardly from the inside face. Visual effect indicia or material disposed on the disc outer face. Means for rotating the discs about their axes of rotation by driving one of the discs. And, links interconnecting the gears together, the links pivotally connected to the gears at the axes of rotation thereof, so that the gears are disposed in a chain. The links preferably comprise a master link having a link body and two upstanding shafts perpendicular to the link body, the shafts extending through two adjacent gear axes of rotation. Each upstanding shaft receives three additional links thereon, passing through apertures in the additional links. Means are provided for holding the additional links and gears on the upstanding shaft so that the gears and additional links may rotate and pivot with respect to the upstanding shaft. Preferably the links and gears are made of plastic.

The invention also relates to a point-of-purchase display assembly which comprises the following elements: At least one disc having an outer face, and rotatable about an axis of rotation generally concentric with the disc. Light transforming material disposed on the disc outer face for receipt of indirect light falling thereon and transforming the light to a distinctive visual display. And, means for rotating the disc to change the orientation of the light transforming material on the disc outer face, to thereby continuously change the visual perception by an observer of the light transforming material and the distinctive visual display provided thereby. The light transforming material preferably is selected from the group consisting essentially of holographic, diffraction material, and patterned metallized foil (such as having a starburst pattern or eccentric circles pattern), although other indicia may be utilized, such as label material of different color applied to the outer face of the discs. The invention also relates to a related method of providing an eye catching display at a point-of-purchase. The method comprises the steps of: (a) Mounting the disc for rotation at the point of purchase in an area where the disc outer face is lit by light. And, (b) rotating the disc about its axis of rotation to change the visual effect provided by the light transmitting material.

In the practice of the above method, it is preferred that a plurality of the discs are interconnected by gear teeth on the periphery thereof which are maintained in a particular angular orientation with respect to each other and step (a) is practiced so that the visual effects provided by adjacent discs are offset from each other; and that step (b) is practiced so that upon rotation of one disc all discs are rotated, with adjacent discs transmitting visual effects at different times. The light transmitting material may be holographic material, and steps (a) and (b) are practiced so that each of three adjacent discs flash in sequence. Step (b) is preferably practiced by rotating the disc at about 10-20 rpm, which is slow enough so that the visual effect desired occurs, but fast enough so that it is eye catching.

It is the primary object of the present invention to provide a simple yet effective point-of-purchase display assembly, and method of catching one's eye at a point-of-purchase display. This and other objects of the invention will become clear from an inspection of the detailed description of the invention, and from the appended claims.

BRIEF DESCRIPTION OF THE DRAWINGS

FIG. 1 is a top plan an view of an exemplary point-of-purchase display module according to one aspect of the present invention;

FIG. 2 is a side view of the module of FIG. 1 partly in cross-section and partly in elevation, and with a portion of the near lens support removed for clarity of illustration over a part thereof;

FIG. 7 is a top plan view showing the interconnection between various modules, such as according to the FIGS. 1 through 4 embodiments, with other structures to provide a point-of-purchase assembly;

FIG. 10 is a top plan view showing yet another embodiment of point-of-purchase display according to the invention in the form of a gear chain;

DETAILED DESCRIPTION OF THE DRAWINGS

Figure 3:
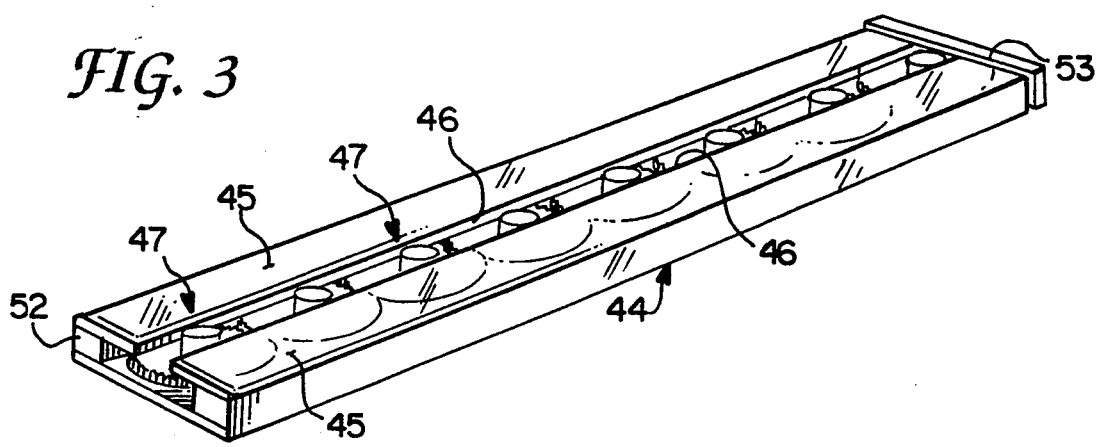
FIG. 3 is a perspective view of another embodiment of an exemplary point-of-purchase assembly according to the invention.

A point-of-purchase display module or signage according to one aspect of the present invention is shown generally by reference numeral 10 in FIGS. 1 and 2. The module includes a linear support, such as an elongated quadrate plate 11, preferably of opaque plastic, with a plurality of discs 12 through 18 associated therewith. Each of the discs, which preferably are substantially identical, comprises a plastic body 20 having gear teeth 21 formed on the periphery thereof, and preferably also has an upstanding hub 22 integral therewith. A through-extending passageway is provided in the hub 22 at the center of the body 20 for receipt of a pivot pin 23 or the like for mounting the disc body 20 for rotation about an axis. The pin 23 is press fit at one end thereof to the support 11, while at the opposite end thereof it is deformed—as indicated at 24—so as to prevent the body 20 and hub 22 from disengaging from the pivot pin 23.

Each of the discs also has an outer face—the face viewed in FIG. 1—with visual effect indicia or material 26 disposed on the disc body 20 outer face. Note that the discs 12 through 18 are mounted to the support 11 by the pivot pins 23 so that the gear teeth 21 thereof intermesh so that when one of the discs 12 through 18 is rotated, all are rotated.

It is preferred according to the invention that the module 10 also include a lens 28 of transparent plastic material, as well as side walls or like means 29, 30 for mounting the lens 28 above the discs 12 through 18 on the opposite side thereof from the support 11. Thus the visual effect indicia or material 26 can be viewed through the lens 28.

It is also preferred that associated with the module 10 a motor or like drive 32 be provided to rotate the discs 12 through 18 at a relatively slow speed. While the speed of rotation will be dependent upon the visual effect desired, and the particular type of visual effect indicia or material 26, in many situations—especially where the visual effect indicia or material 26 is a patterned metallized foil, holographic, and/or diffraction material—the motor 32 will effect rotation of the discs 12 through 18 at about 10-20 rpm. The motor 32 can be mounted to the module 10 in any desired manner, for example by attaching a mounting plate 33 for the motor 32 by double sided adhesive tape to the bottom of the support 11, with the shaft 34 of the motor 32 extending parallel to the axes defined by the pivot pins 23, and having a small gear segment 35 thereon for engaging the gear teeth 21 of preferably an endmost one of the discs 12 through 18—disc 18 illustrated in FIG. 2. For example a one and one-half volt 12 milliamp Mabuchi motor may be utilized, which has very low power consumption. Of course a wide variety of other types of motors, including those powered by incident light, may be utilized.

For the particular module 10 illustrated in FIGS. 1 and 2, a visual effect may be provided by the discs 12 through 14 that is unusual. This is accomplished by providing as the visual effect material 26 a continuous thin polyester holographic diffraction film, such as that sold under the trademark "Spectra Star" by Eye Catchers of Carson, Calif., such as their "Holosheen" holographic film. Not only is it desired that the holographic film be cut out into circular patterns and applied as illustrated in FIG. 1, but it is desired that it be applied in a particular manner so as to get an unusual visual effect. This holographic material comes in rectangular sheets, or on a roll and each circular or annular element 26 to be applied to a disc 12 through 18 is cut (e.g. die cut) from the sheet with the same orientation. For example the orientation is noted by providing marks such as the marks 37, 38, and 39 on the discs 12 through 14 illustrated in FIG. 1. Then, when the discs 12 through 18 are assembled together before the pivot pins or eyelets 23 thereof are deformed at the ends 24 thereof to hold the discs in place, the marks 37-38 are rotated slightly with respect to each other, as are the marks 38, 39. Typically this rotation will be about 20°-30°, depending upon the particular construction of the holographic material. When oriented as illustrated in FIG. 1, the visual effect provided by the discs 12 through 14 will occur in sequence when viewed from any given point of reference. For example, the disc 12 may have a flash of color, as it is rotating at about 10-20 rpm, first, and as the flash of color from the disc 12 is abating a flash of color from the disc 13 will initiate, and as the flash of color from the disc 13 is abating, a flash of color from the disc 14 will initiate. In this way, for every 180° rotation of the discs 12 through 14 there will be a sequential visual burst from the discs, such a visual color burst attempted to be simulated for the disc 13 in FIG. 1.

While the above described construction provides a very unusual and desired visual effect, of course other types of visual effect providing material may be provided. For example associated with the disc 18, the material 26 provides merely alternating sectors 40, 41 of different color, which are on label material and adhesively applied to the outer face of the disc 18, in basically the same manner that the holographic material is applied to discs 12 through 14.

Figure 4:
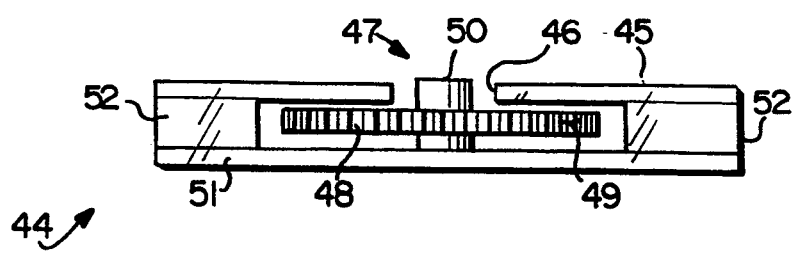
FIG. 4 is an end view of the assembly of FIG. 3.

In situations where the pressing of the pivot pins 23, and the drilling in the support 11 associated therewith, are considered too expensive, a module construction such as illustrated in FIGS. 3 and 4 may be provided. This module is illustrated generally by reference numeral 44 in FIGS. 3 and 4 and includes a support structure, such as plate 45, and means for defining a channel 46 in the plate support 45. A plurality of discs 47 are disposed in operative association with the channel 46, each disc 47 having an outer face 48, gear teeth 49 formed on the circumferential periphery thereof, and a hub 50 opposite the outer face 48. The gear hubs 50 in channel 46 are dimensioned so that the channel 46 receives the gear hubs 50 therein to provide location thereof, while allowing them to be slid into place, one after the other. As seen in FIG. 4, the channel 46 width is slightly greater than the diameter of each of the gear hubs 50. The discs 47 are slid into place so that the gear teeth 49 thereof intermesh.

In order to hold the gears 47 more securely in place, it is preferred that associated with the support plate 45 is a lens 51, preferably of transparent plastic material. The lens 51 is spaced from the plate 45 by side spacer elements 52 a distance slightly greater than the thickness of the bodies of the discs 47. At each end of the channel 46 a retaining element may also be provided. One such retaining element is illustrated by reference numeral 53 in FIG. 3, merely comprising a thin plastic bar provided at the end of the plate 45 across the channel 46 and held in place by repositional adhesive or the like.

As with the FIGS. 1 and 2 embodiment, visual effect indicia or material is disposed on the discs outer faces 48, and a motor—such as the motor 32—may be provided for rotating the discs 47 about their axes of rotation by driving one of the discs.

Figure 5:
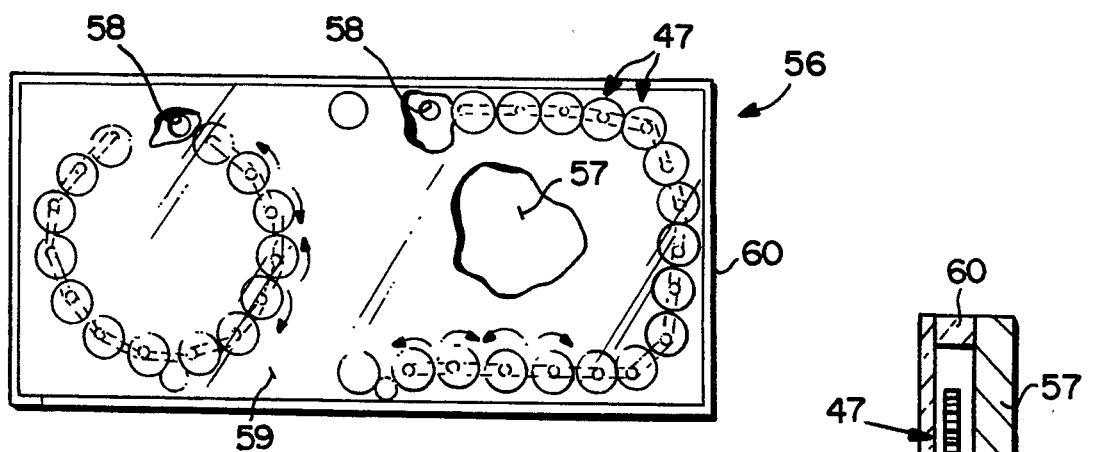
FIG. 5 is a top plan view of another embodiment of point-of-purchase display assembly according to the present invention.
Figure 6:
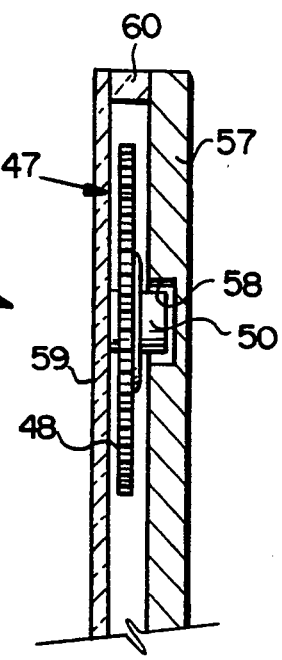
FIG. 6 is a detail cross-sectional view of a portion of the display of FIG. 5.

Yet another embodiment of the point-of-purchase assembly according to the invention is illustrated generally by reference numeral 56 in FIGS. 5 and 6. In this case the support plate 57, preferably of opaque plastic material, has non-linear channels 58 (see FIG. 6) milled or otherwise formed therein, which milled channels 58 are designed to receive the hubs 50 of the discs 47 (identical to the discs 47 in the FIGS. 3 and 4) embodiment. A clear plastic lens (e.g. acrylic) 59 may be provided over the visual effect indicia or material on the outer face 48 of the discs 47, spaced from the plate 57 by spacers 60. For the particular exemplary structure illustrated in FIG. 5, note that two different channels 58 are provided, the left-most one being in the form of a circle, while the one on the right is of curva-linear form. The discs 47 are inserted in place in the FIGS. 5 and 6 embodiment prior to the lens 59 being adhesively, or otherwise, attached to the supports 60.

FIG. 7 illustrates a particular way in which a plurality of modules 10 or 44 may be utilized in association with a sign 62, or other point-of-purchase accessory. In this particular situation, three modules 10, 44 are disposed around three edges of the sign 62, and are driven by a single motor 32. Note that as illustrated in the righthand side of FIG. 7 the two modules there may be affixed together so that gear/disc elements thereof engage directly (as by cutting out part of the side support where they are to engage), or as illustrated on the lefthand side in FIG. 7 an extra piece 63 having an extra gear/disc 64 thereon, which cooperates with the motor 32, may be provided, in which case the ends of the modules 10, 44 need not be modified at all, but rather the extra gear/disc merely engages gears/discs associated with each of the adjacent modules 10, 44.

Figure 8:
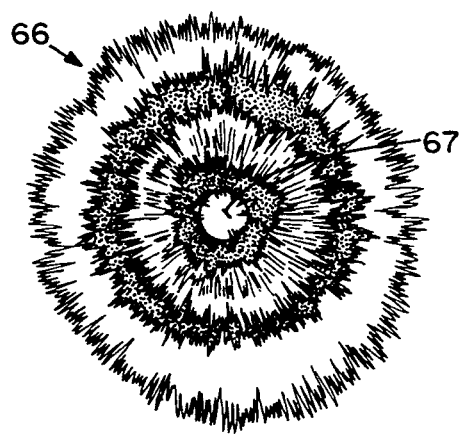
FIG. 8 is a top plan view of a disc outer surface having a starburst metallized foil.
Figure 9:
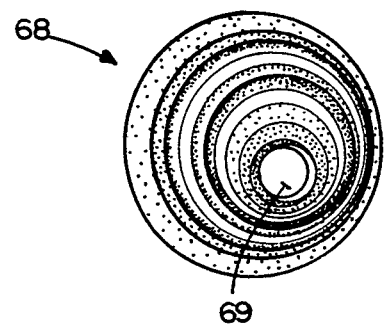
FIG. 9 is a view like that of FIG. 8 only showing the pattern on the disc as a plurality of eccentric circles.

FIGS. 8 and 9 illustrate various extraordinarily distinctive visual effect materials that may be utilized with any of the discs heretofore described, or single discs rotated by a motor, to provide an eye catching effect. FIG. 8 illustrates a metallized foil disc or annulus 66 having a disc of holographic or diffraction material 67 disposed at the center thereof. The disc or annulus 66 was cut out from a sheet of metallized foil sold by Specialty Promotions, Inc. of Carlsbad, Calif. under the general trademark "MANIFESTATIONS", the "NOVA" (201) version. This provides a starburst effect when rotated on a disc, such as the disc 12. FIG. 9 illustrates the "TIME TUNNEL" (203) version of Specialty Promotions' "MANIFESTATIONS", the disc or annulus 68 having a plurality of eccentric circles, preferably with a holographic or diffraction disc 69 disposed at the smallest diameter circle eccentrically located on the disc 68. The discs or annuli 66, 68 are adhesively attached to one of the rotating/gear discs (e.g. 12) according to the invention, or to an independent rotating disc.

FIGS. 10 through 14 illustrate another embodiment of point-of-purchase display assembly according to the invention which is another form of a chain, having various links interconnecting the elements. Such a "chain" construction allows all of the discs to remain together, yet to be disposed in any desired configuration, such as the letter "M" illustrated in FIG. 10.

For the point-of-purchase display assembly shown generally by reference numeral 71 in FIGS. 10 and 11, again a plurality of gears/discs 72 are provided, basically the same as the discs 47 illustrated in FIGS. 3 and 4, including having hubs 73 (see FIG. 11) with the gear teeth 74 on the circumferential peripheries thereof intermeshing, as illustrated in FIGS. 10 and 11.

Each of the discs 72 has visual effect indicia or material 75 disposed on at least one, or possibly both, faces thereof, as illustrated merely for one disc in FIG. 10.

Figure 11:
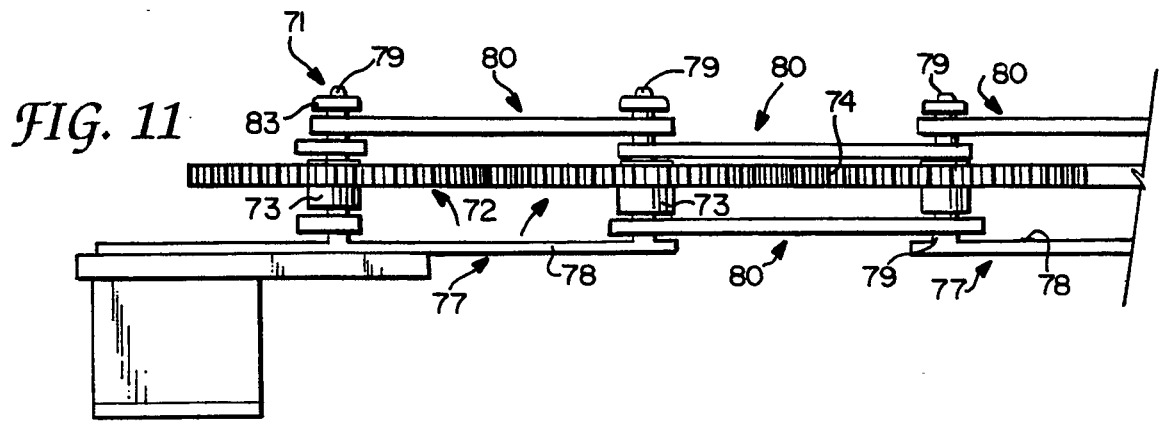
FIG. 11 is a side view of a structure like that of FIG. 10 shown in association with a motor.
Figure 12:
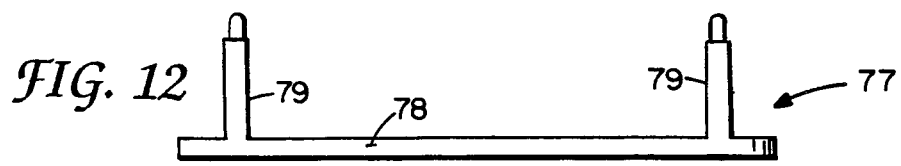
FIG. 12 is a side view of one of the main components (master links) of the assembly of FIGS. 10 and 11.
Figure 14:
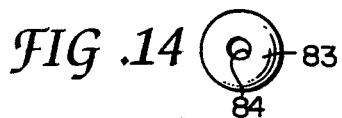
FIG. 14 is a top plan view of a link keeper of the assembly of FIGS. 10 and 11.
Figure 13:
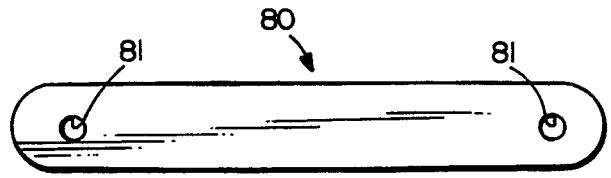
FIG. 13 is a top plan view of another link of the assembly of FIGS. 10 and 11.

Links, shown generally by reference numeral 76 in FIG. 10—are provided interconnecting the centers of the discs 72 together. Preferably, the links 76, which pivotally connect the gears/discs 72 at the axes of rotation thereof so that they are disposed in a chain, are of plastic material and are as illustrated in FIGS. 11 through 13.

Connecting each pair of discs 72 together preferably is a master link 77 having a main body 78 and two upstanding shafts 79, the shafts 79 extending through two adjacent discs/gears 72 axes of rotation. Each shaft receives three common links 80 thereon, each link 80 merely being a flat piece of plastic having a pair of openings 81 at opposite ends thereof, the openings 81 having a internal diameter slightly greater than the external diameter of a shaft 79. Holding the common links 80 onto the shafts 79 are link keepers 83 (see FIGS. 11 and 14), which are merely plastic discs having internal openings 84 with inside diameters virtually the same as the outside diameters of the top tips of the shafts 79, so that they are press fit into contact therewith.

When the assembly 71 of FIG. 10 is constructed, various stabilizing elements (such as stationary supports or clamps) may be provided at the ends of the chain, and a motor—such as the motor 32 for the FIGS. 1 and 2 embodiment—may be mounted anywhere along the chain in operative association with the gear teeth of any one of the gears/discs 72.

Utilizing the assemblies as described above, according to the invention there also is provided a method of affecting an eye catching display at a point-of-purchase utilizing a disc (e.g. 12 through 18, 47, 72) having light transmitting material on an outer surface thereof. The method comprises the steps of mounting the disc for rotation at the point-of-purchase in an area where the disc outer face is lit by light (e.g. fluorescent light from the room, natural light, or a special spot light), and rotating the disc about its axis of rotation to change the visual effect provided by the light transmitting material. This latter step is preferably practiced by rotating the disc at about 10-20 rpm. The effect provided will depend upon the light transmitting material, such as when metallized foil having a plurality of concentric circles are provided a starburst pattern may result, or if a plurality of discs are mounted in a particular way so that the light transmitting material thereon is slightly offset from one disc to another, a sequential effect will be provided (as described above with respect to the discs 12 through 14).

It will thus be seen that according to the present invention a simple yet effective point-of-purchase arrangement has been provided. While the invention has been herein shown and described in what is presently conceived to be the most practical and preferred embodiment thereof it will be apparent to those of ordinary skill in the art that many modifications may be made thereof within the scope of the invention, which scope is to be accorded the broadest interpretation of the appended claims so as to encompass all equivalent structures and methods.

What is claimed is:

1. A sign or point of purchase display assembly, comprising:
    at least one disc having an outer face, and rotatable about an axis of rotation generally concentric with said disc;
    light transforming material, comprising holographic material, diffraction material, or patterned metallized foil, disposed on said disc outer face for receipt of light falling thereon and transforming the light to a distinctive visual display; and
    means for rotating said disc to change the orientation of said light transforming material on said disc outer face, to thereby continuously change the visual perception by an observer of the light transforming material and the distinctive visual display provided thereby.

2. An assembly as recited in claim 1 wherein said light transforming material is a patterned metallized foil having a starburst pattern.

3. An assembly as recited in claim 2 wherein said starburst pattern has a holographic material disc at the center thereof, concentric with said rotating disc center.

4. An assembly as recited in claim 1 wherein said light transmitting material comprises patterned metallized foil, comprising a plurality of eccentric circles pattern.

5. An assembly as recited in claim 1 wherein said at least one disc comprises a plurality of discs each having a periphery, and having gear teeth on the periphery thereof, said gear teeth intermeshing with each other so that driving action applied to one disc drives the others.

6. An assembly as recited in claim 5 further comprising a support structure, and means for defining a channel in said support structure; and wherein each of said discs has an inner face, opposite said outer face, and a hub extending outwardly from said inside face, said channel being dimensioned to receive said hubs therein, interengagement between said hubs and the portion of said support structure defining said channel, and said discs with each other, mounting the gears for rotational movement about parallel axes.

7. An assembly as recited in claim 6 further comprising a lens covering said outer faces of said discs, and cooperating with said channel in said support structure to hold said discs in place.

8. An assembly as recited in claim 5 further comprising links interconnecting said discs together, said links pivotally connected to said discs at the axes of rotation thereof, so that said discs are disposed in a chain.

9. An assembly as recited in claim 8 wherein said links comprise a master link having a link body and two upstanding shafts perpendicular to said link body, said shafts extending through two adjacent disc axes of rotation, and each upstanding shaft receiving three additional links thereon, passing through apertures in said additional links; and means for holding said additional links and discs on said upstanding shafts so that said discs and additional links may rotate and pivot with respect to said upstanding shafts.

10. An assembly as recited in claim 10 wherein said links and discs are made of plastic.

11. An assembly as recited in claim 6 wherein said discs are made of plastic.

12. An assembly as recited in claim 5 wherein said light transforming material comprises sections of material disposed on adjacent discs in spaced sequences so that upon rotation of said discs adjacent discs transmit visual effects at different times.

13. An assembly as recited in claim 1 wherein said light transmitting material simulates the effects of a starburst.

14. An assembly as recited in claim 1 wherein said light transmitting material is printed on a plastic film, and wherein said plastic film is adhesively secured to said disc outer face.

15. A sign or point of purchase display assembly, comprising:
  a plurality of discs each having an outer face, a circumferential periphery, and an inner face, and rotatable about an axis of rotation generally concentric with said disc, and gear teeth formed on the circumferential periphery thereof, said gear teeth of said discs intermeshing so that driving of one disc drives the others; and wherein each of said discs has an inner face, opposite said outer face, and a hub extending outwardly from said inside face;
  visual effect indicia or material disposed on each disc outer face;
  means for rotating said discs about their axes of rotation by driving one of said discs;
  a support structure, and means for defining a channel in said support structure, said channel being dimensioned to receive said disc hubs therein, interengagement between said hubs and said means for defining said channel, and said disc's gear teeth with each other, mounting the discs for rotational movement about the parallel axes; and
  a lens covering said outer faces of said gears, and cooperating with said channeled support structure to hold said gears in place.

16. An assembly as recited in claim 15 comprising further indicia associated with said support structure and lens to transmit information to a point of purchase viewer.

17. An assembly as recited in claim 15 wherein said visual effect material comprises sections of material disposed on adjacent discs in spaced sequences so that upon rotation of said discs adjacent discs transmit visual effects at different times.

18. A method of providing an eye catching display at a point of purchase utilizing a disc having light transmitting material on an outer surface thereof, and wherein the light transmitting material is metallized foil having a plurality of concentric circles having different orientations and/or properties, comprising the steps of:
  (a) mounting the disc for rotation at the point of purchase in an area where the disc outer face is lit by light; and
  (b) rotating the disc about its axis of rotation to change the visual effect provided by the light transmitting material; and wherein steps (a) and (b) are practiced to produce a starburst pattern.

19. A method as recited in claim 18 wherein a plurality of discs each having a circumferential arc are interconnected by gear teeth on the circumferential periphery thereof and are maintained in a predetermined angular orientation with respect to each other, and wherein step (a) is practiced so that the visual effects provided by adjacent discs are offset from each other; and wherein step (b) is practiced so that upon rotation of one disc all discs are rotated, with adjacent discs transmitting visual effects at different times.

20. A method as recited in claim 18 wherein step (b) is practiced by rotating the disc at about 10–20 rpm.

21. A sign or point of purchase display module comprising: a linear support;
  a plurality of discs each having an outer face and a circumferential periphery, and rotatable about an axis of rotation generally concentric with said disc, and gear teeth formed on the circumferential periphery thereof;
  visual effect, non-alphanumeric, indicia or material disposed on each disc outer face;
  means for mounting said discs to said linear support in a one-dimensional linear array with the teeth of adjacent discs intermeshing, and with said outer face of each facing away from said linear support; wherein said visual effect indicia or material comprises spaced sections of holographic material, the holographic material sections on adjacent discs being off set from each other, so that when the discs are rotated adjacent discs transmit visual effects at different times.

22. A module as recited in claim 21 further comprising a lens and means for mounting said lens so that it is located over said disc outer faces.

23. A module as recited in claim 22 further comprising motor means operatively mounted to said support, and having a drive shaft operatively connected to one of said disc's peripheral gear teeth, said motor comprising means for rotating said discs at about 10–20 rpm.

24. A module as recited in claim 22 wherein said support, discs, lens, and means for mounting said lens are plastic.

25. A method of providing an eye catching display at a point of purchase utilizing a disc having holographic light transmitting material on an outer surface thereof, and wherein a plurality of discs each having a circumferential are interconnected by gear teeth on the circumferential periphery thereof and are maintained in a predetermined angular orientation with respect to each other, comprising the steps of:
  (a) mounting the disc for rotation at the point of purchase in an area where the disc outer face is lit by light; and
  (b) rotating the disc about its axis of rotation to change the visual effect provided by the light transmitting material; wherein step (a) is practiced so that the visual effects provided by adjacent discs are offset from each other; and wherein step (b) is practiced so that upon rotation of one disc all discs are rotated, with adjacent discs transmitting visual effects at different times; and wherein steps (a) and (b) are practiced so that each of three adjacent discs flash in sequence.

26. A sign or point of purchase display module comprising:
  a linear support;
  a plurality of discs each having an outer face and a circumferential periphery, and rotatable about an axis of rotation generally concentric with said disc, and gear teeth formed on the circumferential periphery thereof;
  visual effect, non-alphanumeric, indicia or material disposed on each disc outer face;
  means for mounting said discs to said linear support in a one-dimensional linear array with the teeth of adjacent discs intermeshing, and with said outer face of each facing away from said linear support;
  a lens and means for mounting said lens so that it is located over said disc outer faces; and
  wherein said visual effect indicia or material is selected from the group consisting essentially of holographic material, diffraction material, and patterned metallized foil.

* * * * *